US007217078B2

(12) United States Patent
Short

(10) Patent No.: US 7,217,078 B2
(45) Date of Patent: May 15, 2007

(54) WASTE RECEPTACLE TRANSPORTER

(76) Inventor: Russell James Short, 10 Hidden Meadow La., Scotts Valley, CA (US) 95066

( * ) Notice: Subject to any disclaimer, the term of this patent is extended or adjusted under 35 U.S.C. 154(b) by 270 days.

(21) Appl. No.: 10/945,210

(22) Filed: Sep. 20, 2004

(65) Prior Publication Data

US 2006/0062658 A1 Mar. 23, 2006

(51) Int. Cl.
*B60P 9/00* (2006.01)
*B60P 7/00* (2006.01)

(52) U.S. Cl. ....................... 414/462; 224/282; 224/537

(58) Field of Classification Search ................ 414/462, 414/486; 224/282, 315, 504–508, 537
See application file for complete search history.

(56) References Cited

U.S. PATENT DOCUMENTS 4,400,129 A * 8/1983 Eisenberg et al. .......... 414/462
4,561,575 A * 12/1985 Jones ...................... 224/42.21
5,303,857 A * 4/1994 Hewson ...................... 224/506
5,346,357 A * 9/1994 Hassell ....................... 414/462
5,449,101 A * 9/1995 Van Dusen ................. 224/506
5,489,110 A * 2/1996 Van Dusen ............. 280/415.1
5,961,272 A * 10/1999 Short ......................... 414/462
6,033,178 A * 3/2000 Cummins ................... 414/462
6,164,896 A * 12/2000 Cummins ................... 414/462
6,361,264 B1 * 3/2002 Guthrie et al. ............. 414/462
6,698,995 B1 * 3/2004 Bik et al. ................... 414/462

* cited by examiner

*Primary Examiner*—Patrick Mackey
*Assistant Examiner*—Charles Greenhut

(57) ABSTRACT

A vehicle mounted carrier for lifting and securing in an elevated position waste receptacles and other articles for transport. A housing including a pair of side plates, a rear plate and a bottom plate having apertures for mounting to a conventional trailer tow hitch assembly or to a vehicle bumper. A lever arm terminating at one end in a channel for receiving the article of transport and pivotally connected to the housing at the opposite end. A latch assembly is provided for securing the article of transport in an elevated position and for selectively releasing allowing the user to controllably lower and disengage the article of transport. The latch assembly includes a latch rod operably secured to a pair of springs secured to the lever arm and a pair of springs secured to the latch rod and to a lever handle. Lever arm stop element secured to the housing to limit the rotation of the lever arm.

18 Claims, 8 Drawing Sheets

WASTE RECEPTACLE TRANSPORTER

BACKGROUND OF THE INVENTION

1. Field of the Invention

The invention relates to receptacle transport devices, and more particularly to transport devices for transporting waste receptacles on vehicles.

2. Description of Prior Art

Many waste disposal companies are providing their customers with special trash receptacles and recycle bins for weekly curbside pickup. The receptacles provided by the waste disposal companies are typically larger in size and accommodate greater volume and weight than typical thirty-two gallon trash receptacles. Many of these receptacles are equip with a horizontal lift bar for automated dumping into waste disposal vehicles. Typically the receptacles are equipped with wheels, which allow the user to wheel the receptacles to the desired location.

In many rural areas the trash source location, typically a residence, is located a considerable distance to the waste disposal company pick-up point, typically the public right-of-way. The oversized trash receptacles will not fit into most passenger vehicles and the increased weight capacity these receptacles accommodate make it difficult to lift the fully loaded receptacle into the bed of a pick-up truck or into the trunk of a passenger vehicle.

One current method of transporting the trash receptacles is by means of a trailer. Transporting the trash receptacles in a trailer towed behind a passenger or light truck vehicle has several disadvantages.

a) With a trailer in tow, vehicle maneuvering is restricted or requires special attention.

b) Trailers may not accommodate various sizes of trash receptacles.

c) Trash receptacles must be secured to prohibit overturning when transporting on steep terrain.

d) The trailer must be left at the pick up point thereby subject to theft of vandalism or the trailer must be returned to the residence, and then towed back again to recover the emptied trash receptacle.

There is needed, therefore a means for transporting the oversized and over weighted trash receptacles without the limitations described for trailering and in a method which does not require the user to lift the full loaded weight of the trash receptacle in order to transport.

Another current method of transporting the trash receptacles is for the user to manually wheel the trash receptacle to the waste disposal company pick-up point. This method is often impractical due to the distance required for transport, inclement weather, slope or condition of terrain, and automatic gates, which open only upon sensing an approaching vehicle.

SUMMARY OF INVENTION

The carrier described herein serves to fulfill the need by providing a means of transporting the oversized trash receptacles equipped with a horizontal lift bar by a passenger or light truck vehicle from the point of trash generation (typically a residence) to the waste company pick up point (typically the public right of way) without having to manually lift the full weight of the loaded receptacle. The carrier can accommodate various sizes of the trash receptacles and can be mounted on a trailer towing assembly or bumper hitch assembly.

In one form of the carrier, this need is realized by a lever arm, which terminates at one end at a channel designed to receive a horizontal lift bar of the receptacle. The other end of the lever arm is attached to a housing base. The housing base consists of a bottom and rear plate with end side panels on each side. The lever arm is mounted to the side panels and is free to pivot. The housing base can be mounted at the exterior of a vehicle typically at a trailer towing receiver system or bumper hitch system. Alternate method of mounting the carrier on the exterior of a vehicle include suspending the carrier on a bracket mounted to the bumper of the vehicle.

To load the trash receptacle, the horizontal bar of the trash receptacle is placed into the channel with the lever arm in the down position. A horizontal and slightly upward force applied to the trash receptacle by the user lifts the receptacle. This force is continued until the receptacle is lifted to the full up position at which point the lever arm is automatically latched in the up position. The latching of the lever arm is accomplished by a latch rod, springs and grooves within the housing base. A handle pivots on the lever arm and is interconnected by springs to the latch rod.

To ready the carrier for automatic latching prior to loading the receptacle, the lever arm is lowered. The trash receptacle is loaded and a force applied as previously described. As the lever arm is rotated up, a horizontal latch rod extending through slotted openings in the lever arm and resting on the leading edge of the housing base is guided into grooves on each side of the housing base. Spring tension secures the latch rod in the grooves, latching the lever arm in the up position. At this point, the trash receptacle is suspended clear of the ground and is ready for transport.

To lower the receptacle and lever arm, the user manually repositions a handle, which applies an upward spring tension on the latch rod. In the up position the weight of the trash receptacle holds the rod tight to the housing grooves and prohibits upward motion of the latch rod. With the handle in this position, the receptacle and lever arm is held in the up position until the user applies a horizontal force to the receptacle opposite the gravitational force imparted by the trash receptacle, allowing the latch rod to move upward and free of the housing grooves. The lever arm is now free to rotate which allows the user to lower the trash receptacle and lever arm in a controlled manner.

The carrier can be mounted to a vehicle in several methods. In the preferred method, the housing base is attached to a standard trailer towing hitch bar or vehicle bumper hitch. This attachment is accomplished by positioning the center hole in the bottom of the base plate over the hole in the hitch bar or bumper hitch and inserting the treaded portion of a bolt or inverted hitch ball through both base plate and hitch bar or bumper hitch. The hitch ball or bolt is secured in place with the application of a threaded nut and lock washer, thus clamping the housing base and hitch bar or bumper hitch together. Rotation of the housing base is restricted by stops located on the bottom of the housing base and positioned on each side of the hitch bar.

BRIEF DESCRIPTION OF THE DRAWING FIGURES

Figure 4A:
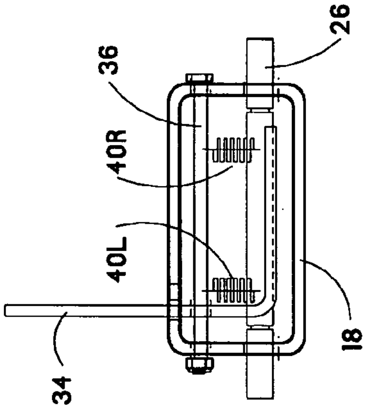

FIG. 4*a* shows a section of the lever arm with handle and latch rod.

Figure 4B:
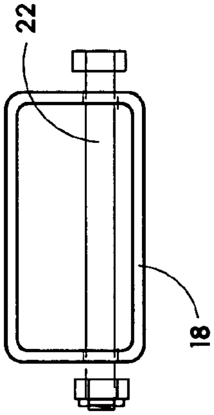

FIG. 4*b* shows a section of the lever arm with axis or rotation bolt.

Figure 5:
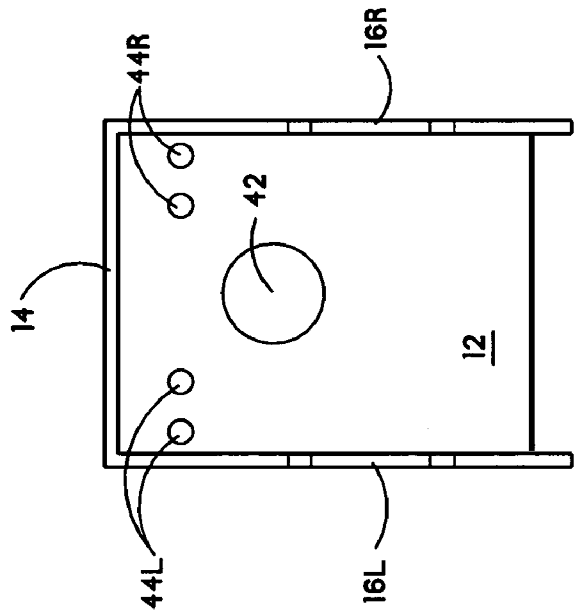

FIG. 5 shows a top view of the housing base. The lever arm assembly not shown.

Figure 6:
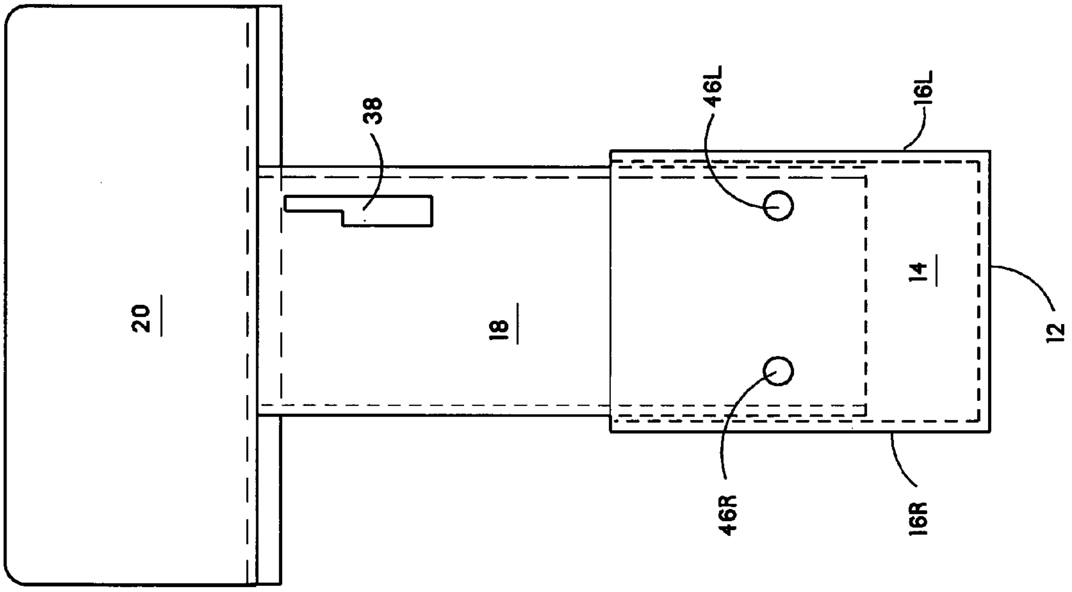

FIG. 6 shows a rear view of the lever arm and housing.

Figure 7:
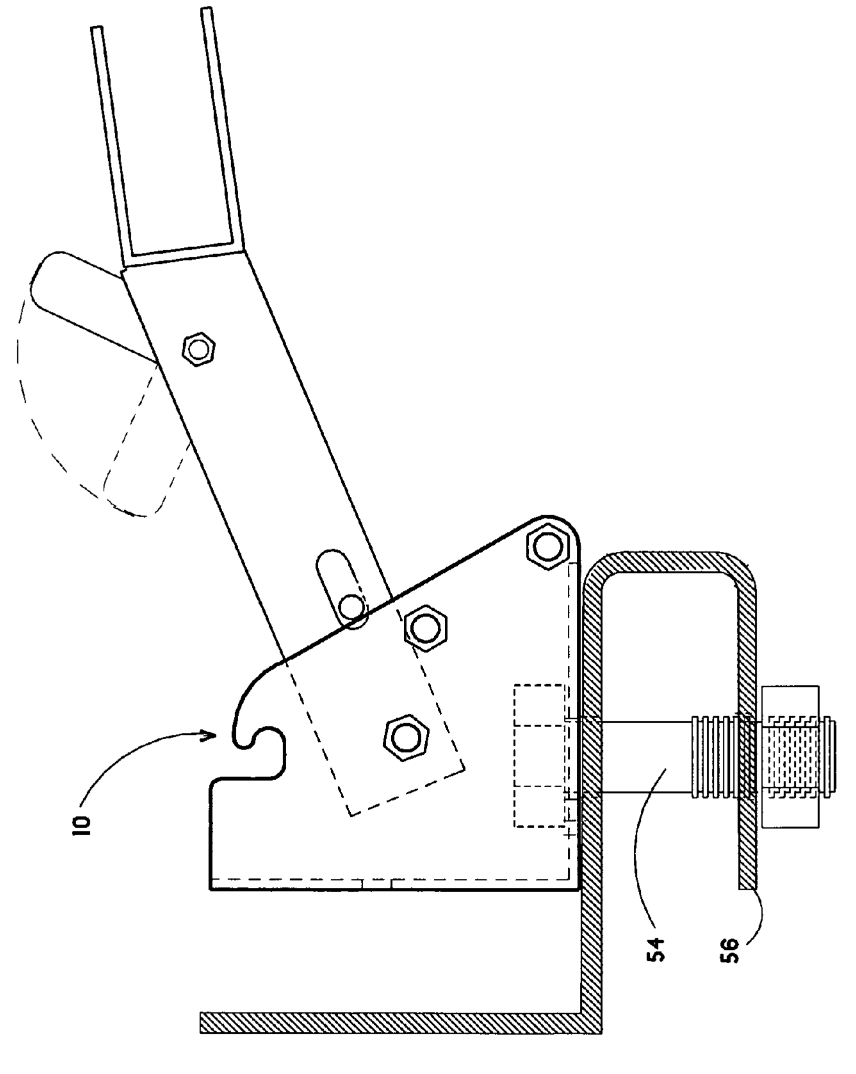

FIG. 7 shows the carrier in side view mounted directly to a vehicle bumper.

Figure 8:
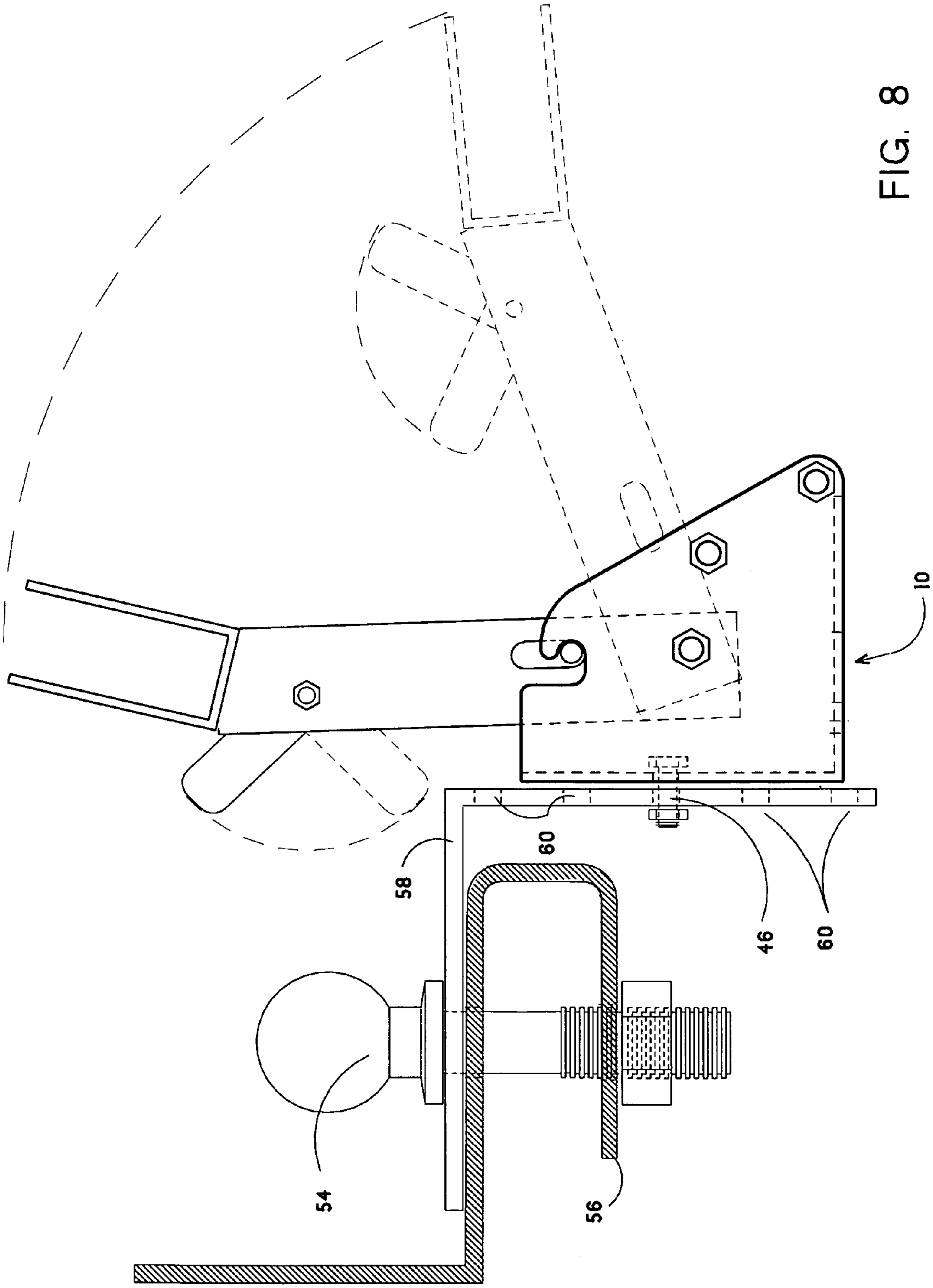

FIG. 8 shows the carrier in side view mounted to a vehicle bumper by means of brackets attached to the bumper.

DETAILED DESCRIPTION OF THE PREFERRED EMBODIMENT

Figure 1:
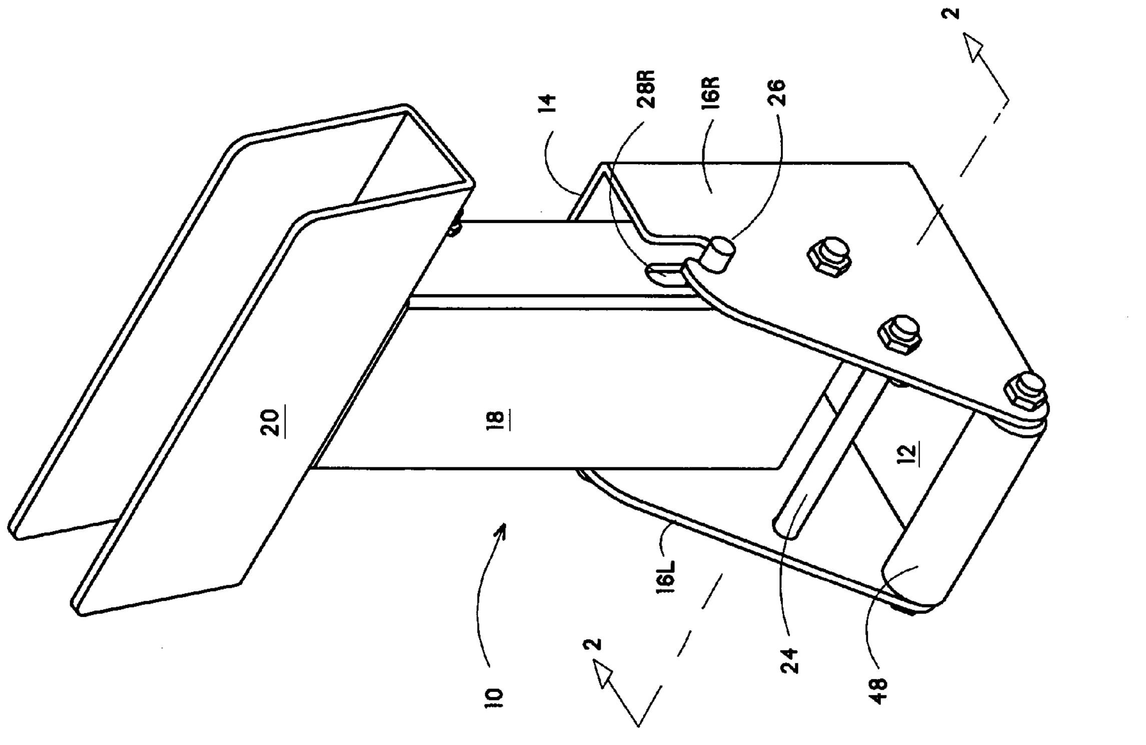
FIG. 1 shows an isometric view of the carrier with the lever arm in the up and latched position.

Referring to FIG. 1, it will be seen that an illustrative embodiment of the carrier is designated by the reference numeral 10 as a whole. The body of the carrier consists of a housing bottom plate 12, a housing rear plate 14, and a right and left housing side plate 16R and 16L respectively. In the preferred embodiment, the housing plates are constructed of flat steel plate and welded together at their intersections. However the housing plates can consist of any rigid material of sufficient rigidity to resist the loads imparted and which can be joined or formed.

Referring to FIG. 1 a lever arm 18 is joined to a receiver channel 20 at one end. The width of the lever 18 is sufficient to provide clearance between the interior walls of the housing side plates 16R and 16L.

Figure 2:
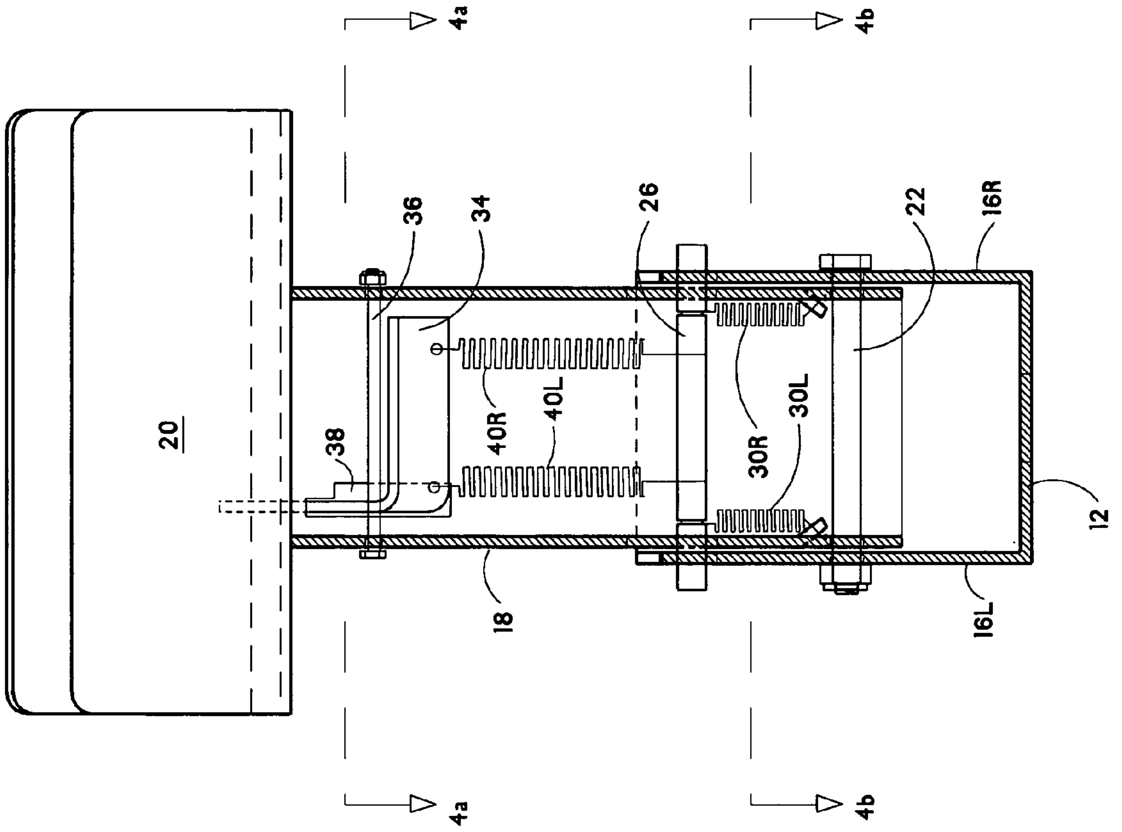
FIG. 2 shows the front view section with the lever arm in the up position. The latch rod and handle are shown in the latched position.

Referring to FIG. 2 the lever arm 18 is secured to the housing side plates 16R and 16L by lever arm mounting assembly 22 comprising of bolt, and nut assembly. The bolt of mounting assembly 22 is inserted through a mounting hole in the housing side plates 16 and through the full width of the lever arms 18. Lever arm 18 is free to pivot about lever arm mounting assembly 22.

Figure 3:
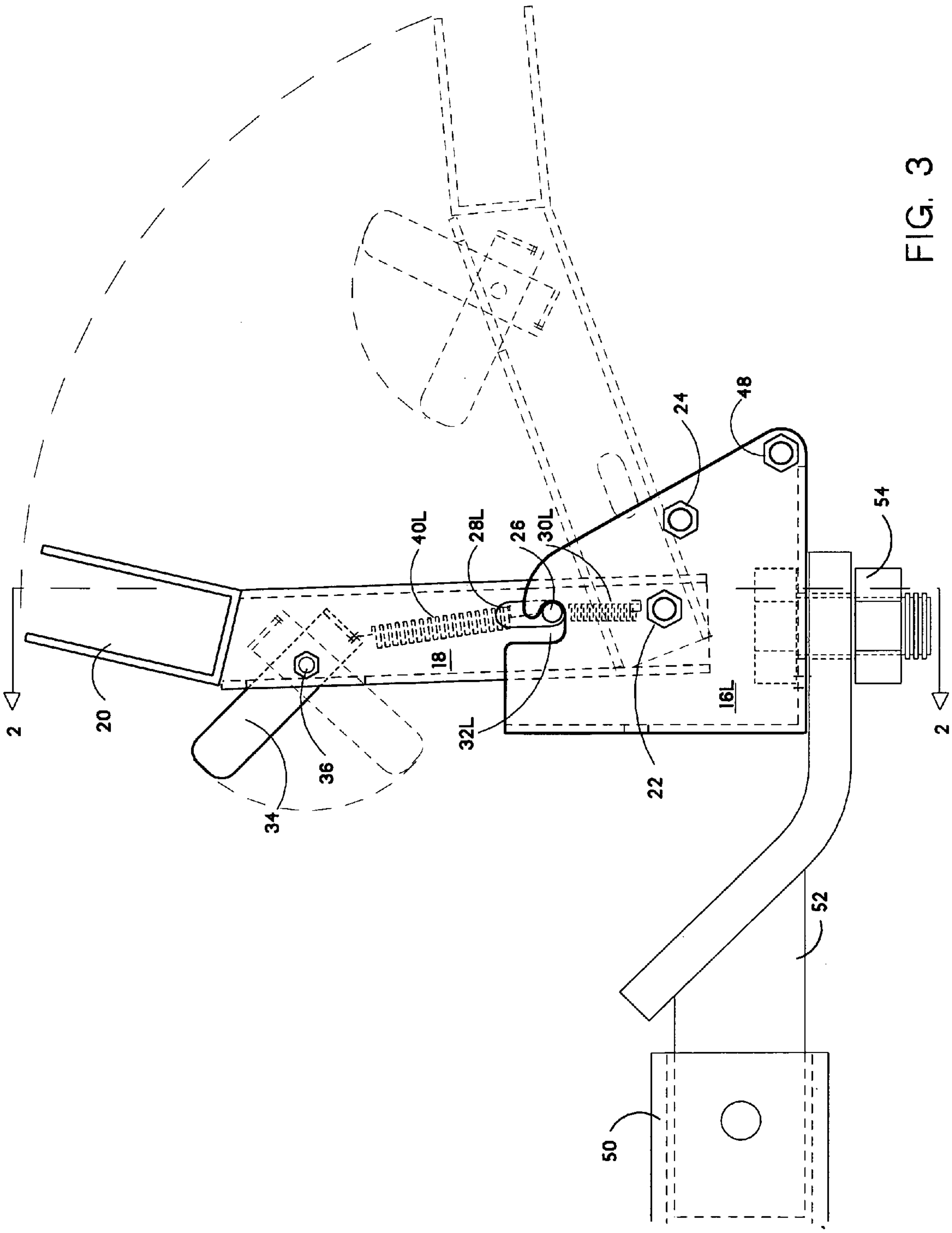
FIG. 3 shows a side view with the lever arm in the up position (bold line) and in the down position (dashed line) mounted to a conventional trailer hitch bar assembly.

Referring to FIG. 3 the degree of rotation of lever arms 18 is restricted by a lever arm stop 24 consisting of a bolt and nut assembly mounted to side housing plates 16R and 16L. Lever stop 24 restricts the rotation of lever arm 18 to approximately twenty degrees of horizontal when lever arm 18 is in the down position. This angle from horizontal is approximate and shall be of sufficient degree to cause rotation of the lever arm 18 when a horizontal force is applied to receiver channel 20. Latch rod 26 restricts the degree of rotation of the lever arm 18 in the up position. Latch rod 26 restricts the degree of rotation of lever arm 18 to several degrees beyond vertical. The extent of rotation is depicted in FIG. 3 with lever arm 18 indicated in the down position as dashed line and in the up position indicated as bold line weight.

Referring to FIG. 3, the receiver channel 20, consisting of a steel channel is welded to lever arm 18 which consist of tube steel. Lever arm 18 can be constructed of alternate shapes or material sufficient to withstand the loads imparted. With lever arm 18 in the down position, receiver channel 20 is approximately five degrees of horizontal. The length of channel 20 is approximately one and a half inches shorter than the horizontal lift bar of the receptacle being transported. This length allows for flexibility in positioning the receptacle in relation to the receiver channel 20. The width of receiver channel 20 is approximately thirty percent wider than the diameter of the horizontal lift bar of the receptacle. This additional width compensates for horizontal lift bars of the receptacle that might be bent. The depth of receiver channel 20 is sufficient to prohibit the horizontal lift bar of the receptacle from accidentally being jolted out of the receiver channel 20 during transport.

Returning to FIG. 3, a latch rod 26 is shown. Latch rod 26 extends through slotted aperture 28R and 28L on each side of lever arm 18 and extends beyond side housing plates 16R and 16L. Springs 30R and 30L attach to the side housing plates 16R and 16L respectively at one end and to latch rod 26 on the opposing end. Springs 30R and 30L impose a tension on latch rod 26 towards the pivot point mounting assembly 22. With lever arm 18 in the down position, latch rod 26 rests on the leading edge of sidewalls 16R and 16L. As lever arm 18 is rotated towards the up position, the distance between pivot point mounting assembly 22 and the leading edge of side housing plates 16R and 16L increases creating tension in springs 30R and 30L. Slotted aperture 28R and 28L at the sides of lever arm 18 restrict movement of latch rod 26. Latch grooves 32R and 32L are located on side panels 16R and 16L respectively. Rotation of lever arm 18 is restricted in the up position by contact of latch rod 26 with latch groove 32R and 32L. In the full up position the tension imparted by springs 30R and 30L pulls latch rod 26 into latch grooves 32R and 32L.

A lever handle 34 is indicated in FIG. 3. A lever handle mounting assembly 36 comprising of a bolt, and nut assembly is indicated and extends the full width of lever arm 18 through apertures on each side of lever arm 18. Mounting assembly 36 extends through an aperture in lever handle 34 allowing lever handle 34 to pivot about mounting assembly 36 and to slide laterally. Lateral and rotational movement is restricted by the extension of lever handle 34 though handle lock groove 38. Handle lock groove 38 is located on the rear side of lever arm 18 and is depicted in FIG. 5. Lever handle 34 protrudes beyond the interior wall of lever arm 18 sufficient length to grasp and reposition. Lever handle 34 consists of an angled steel bar in this embodiment of sufficient thickness to perform the functions described herein without deformation. However any rigid material of sufficient rigidity to resist the loads imparted could be substituted.

Referring to FIG. 2, Springs 40R and 40L attach to the interior leg of lever handle 34 and to latch rod 26 on the opposing end. Rotating lever handle 34 imparts spring tension on latch rod 26 by means disclosed herein.

Referring to FIG. 5 a top view of housing bottom plate 12 having a center hole is designated as a hitch hole 42 that is located in the longitudinal center of housing bottom plate 12. Hitch hole 42 is located sufficient distance from housing rear plate 14 to allow a one inch diameter bolt and nut assembly to be inserted in hitch hole 42.

Anti rotation holes 44R and 44L located in housing bottom plate 12 are positioned equal-distance in pairs right and left of the centerline of hitch hole 42. Machine bolts with nuts are inserted into the appropriate set of holes and act as stops on each side of a hitch bar to resist rotation of housing bottom plate 12 about hitch hole 42. A series of anti-rotation holes 44R and 44L are provided to accommodate several standard widths of hitch bars.

Referring to FIG. 6 mounting holes 46R and 46L are located in housing rear plate 14. Mounting holes 46R and 46L are located equal distances from housing side plates 16R and 16L respectively.

Referring to FIG. 1 a load distribution bumper 48 consisting of a horizontal cylindrical is mounted between the interior walls of side housing plates 16R and 16L. In this embodiment load distribution bumper 48 consists of a bolt and nut assembly encased with rubber tubing however any horizontal shape and attachment method could be utilized to distribute the load over an increased area.

The carrier 10 is designed to mount on the exterior of a passenger or light truck vehicle by several methods. In FIG. 3 the carrier is attached to a conventional trailer-towing receiver 50 and hitch bar 52. Carrier 10 is secured to hitch bar 52 with a bolt and nut assembly 54. Referring to FIG. 7 the carrier can also be attached to a vehicle bumper hitch 56 in a similar manner. Attachment is accomplished by positioning the hitch hole 42 located in housing bottom plate 12 over the hole in the hitch bar 52 or bumper hitch 56 and inserting the treaded portion of the bolt 54 through hitch hole 42 and the hitch hole of the hitch bar 52 or bumper hitch 56. The bolt 54 is secured in place with the application of a threaded nut and lock washer, thus clamping the housing bottom plate 12 and hitch bar or bumper hitch together.

Referring to FIG. 8 an alternate mounting method is illustrated. Bumper bracket 58 consists of an angled steel plate comprising of a horizontal and vertical leg. A series of vertical holes 60R and 60L are located on the vertical leg of bumper bracket 58 and correspond in width to mounting holes 46R and 46L. Carrier 10 is mounted to bumper bracket 58 by aligning mounting holes 46R and 46L with vertical holes 60R and 60L respectively at the desired vertical distance above the ground and secured with bolt and nut assemblies. Bumper bracket 58 is secured to a bumper hitch 56 by inserting a bolt or hitch ball through an aperture located in the center of the horizontal leg of bumper bracket 58 and through the hitch hole of bumper hitch 56. In this embodiment, bumper bracket 58 is constructed of steel plate formed or welded into the shape illustrated. However any rigid material of sufficient rigidity to resist the loads imparted could be substituted.

OPERATION OF THE INVENTION

With the carrier mounted by one of the methods described herein and with lever arm 18 in the down position, the carrier is now ready to be loaded. In the case of transporting wheeled trash receptacles having a horizontal lift bar the user aligns the receptacle's horizontal lift bar with the receiver channel 20. Alignment of lift bar and receiver channel 20 can be accomplished by tilting the trash receptacle on the wheels thereby raising the lift bar to the desired height. The user places the horizontal lift bar of the receptacle inside receiver channel 20 and applies a horizontal and slightly upward force to the trash receptacle. This force causes the lever arm 18 to rotate about lever arm mounting assembly 22 in the upward direction and lifting the trash receptacle clear of the ground.

As lever arm 18 is rotated towards the up position, latch rod 26 travels along the leading edge of housing side plates 16R and 16L increasing tension in springs 30R and 30L.

In the full up position the tension imparted by springs 30R and 30L pulls latch rod 26 into latch grooves 32R and 32L. Now in the latched position, latch rod 26 is held in place by a combination of factors. The remaining tension imparted by springs 30R and 30L pulls latch rod 26 downward toward the center of lever arm rotation. The center of mass of the trash receptacle is offset from the center of rotation of lever arm 18. This offset imparts a force to lever arm 18 thereby pulling latch rod 26 tight against the forward radius surface of latch grooves 32R and 32L into the latched position. In the latched position, the trash receptacle is suspended clear of the ground and secured in place ready for transport.

With the trash receptacle in the suspended and latched position, the transport vehicle is unrestricted in movement and can deliver the trash receptacle to the point of discharge. To lower the receptacle and lever arm 18 the user must first reposition lever handle 34. Lever handle 34 is rotated in the down position and locked in place by sliding the handle into the narrow portion of handle lock groove 38. Rotating lever handle 34 to the down position increases tension in springs 40R and 40L imparting an upward force to latch rod 26. This upward force is greater than the downward force imparted by springs 30R and 30L however latch rod 26 remains stationary in the latched position due to the frictional force between latch rod 26 and latch grooves 32R and 32E. This frictional force is supplied by the center of mass of the receptacle being offset from the rotation center of lever arm 18. The user positioned behind the trash receptacle now applies a force to the receptacle opposite in direction to the gravitational force produced by the trash receptacle. This allows latch rod 26 to move within latch grooves 32R and 32L releasing the frictional force on latch rod 26 and allowing the force imparted by springs 40R and 40L to pull latch rod 26 free of latch grooves 32R and 32L. The user can now lower the receptacle and lever arm 18 in a controlled manner. Once on the ground, the user wheels the trash receptacle clear of receiver channel 20.

Lever arm 18 can now be rotated into the up position and secured in the latched position as previously described.

ADVANTAGES OF THE INVENTION

With the trash receptacle in the suspended and latched position, the transport vehicle is unrestricted in movement. The transport vehicle may backup or move forward on steep or flat terrain. Other devices for transport such as trailers restrict vehicle movement or require special attention when maneuvering. The trash receptacle is suspended in receiver channel 20 that has a depth sufficient to prohibit the receptacle from being jolted out of the channel on rough roads. The trash receptacle is held in place by the front edge of housing side plates 16 and load distributing bumper 48 prohibiting tipping or overturning of the receptacle when transporting on steep terrain. This is a clear advantage over transporting a trash receptacle in a trailer or the bed of a pickup truck where the receptacle easily tips over during transport. The mechanical advantage of lever arms 18 reduces the amount of effort required of the user to position the trash receptacle for transport. This is a clear advantage over other methods of transport where the full weight of the receptacle must be lifted such as into the bed of a pickup truck. Many of the larger trash receptacles allow a load up to 250 pounds. Clearly a user would not want to lift this full weight.

What is claimed is:

1. A carrier for carrying waste receptacles, comprising:

a housing, said housing having a bottom plate, a rear plate, and a pair of side plates, said pair of side plates each having a latch recess and curved front edge:

a lever arm, said lever arm terminating at one end in a receiving channel sized to receive a horizontal bar of a waste receptacle; said lever arm being pivotally secured to said pair of housing side plates to rotate about a lever arm axis;

a latch rod operably secured within said lever arm and in contact with an edge of said pair of side plates;

a first pair of springs, said first pair of springs being secured to said latch rod and to said lever arm; wherein tension in said first pair of springs pull said latch rod into engagement with said latch recess upon rotation of said lever arm to a latched transport position;

a second pair of springs, said second pair of springs being secured to said latch rod and to a lever handle pivotally mounted to said lever arm; wherein tension in said second pair of springs imparts a disengagement force to said latch rod from said latch recess upon rotation of said lever handle to an unlatched position, and means for mounting said housing to a vehicle.

2. The carrier for carrying waste receptacles of claim 1, wherein said housing is composed of metal.

3. The carrier for carrying waste receptacles of claim 1, wherein said lever arm is pivotally secured to said housing side plates by a lever arm mounting assembly.

4. The carrier for carrying waste receptacles of claim 1, wherein said receiving channel is a metal channel comprised of walls, said lever arm welded to one of said walls of said metal channel.

5. The carrier for carrying waste receptacles of claim 1, wherein said latch rod is operably secured to said lever arm by said pair of springs by hooking said springs within a recess of said latch rod and hooking said springs to said lever arm.

6. The carrier for carrying waste receptacles of claim 1, wherein said lever handle is operably secured to said latch rod by said second pair of springs by mounting said springs through an aperture in said lever handle and hooking said springs around said latch rod.

7. The carrier for carrying waste receptacles of claim 1, further including a lever arm stop secured to said side-housing plates.

8. The carrier for carrying waste receptacles of claim 1, wherein said lever handle is rotated from a latched position to said unlatched position by pivoting and positioning said lever handle imparting a disengagement force by said second pair of springs to said latch rod, wherein a gravitational force imparted by the center of mass of the transported waste receptacle while in said latched transport position being offset from said lever arm rotational axis imparts a force to maintain said latch rod in the latched transport position.

9. The carrier for carrying waste receptacles of claim 8, wherein moving said waste receptacle carried by said receiving channel in a direction opposite to the direction of said gravitational force imparted by said offset distance allows said latch rod to move clear of said latch recess thereby permitting rotation of said lever arms into the loading/unloading position.

10. A carrier mounted to a vehicle, for carrying and transporting articles, comprising:

a housing, said housing having a bottom plate, a rear plate, and a pair of side plates, said pair of side plates each having a latch recess and curved front edge:

a lever arm said lever arm terminating at one end in a receiving channel carrying an article; said lever arm being rotatably secured to said pair of housing side plates to rotate about a lever arm axis;

a latch rod operably secured within said lever arm and in contact with an edge of said pair of side plates;

a first pair of springs, said first pair of springs being secured to said latch rod and to said lever arm; wherein tension in said first pair of springs pull said latch rod into engagement with said latch recess upon rotation of said lever arm to a latched transport position, a second pair of springs, said second pair of springs being secured to said latch rod and to a lever handle pivotally mounted to said lever arm; wherein tension in said second pair of springs imparts a disengagement force to said latch rod from said latch recess upon rotation of said lever handle to an unlatched position.

11. The carrier mounted to a vehicle of claim 10, further including a bracket means for mounting said housing to said vehicle.

12. The carrier mounted to a vehicle of claim 10, further including a means for securing said housing to a tow hitch assembly.

13. The carrier mounted to a vehicle of claim 10, wherein said lever arm is pivotally secured to said housing side plates by a lever arm mounting assembly.

14. The carrier mounted to a vehicle of claim 10, wherein said latch rod is operably secured to said lever arm by said pair of springs by hooking said springs within a recess of said latch rod and hooking said springs to said lever arm.

15. The carrier mounted to a vehicle of claim 10, wherein said receiving channel is a metal channel comprised of walls, said lever arm welded to one of said walls of said metal channel.

16. The carrier mounted to a vehicle claim 10, further including a lever arm stop secured to said side-housing plates.

17. The carrier mounted to a vehicle of claim 10, wherein said lever handle is rotated from a latched position to said unlatched position by pivoting and positioning said lever handle imparting a disengagement force by said springs to said latch rod, wherein a gravitational force imparted by the center of mass of the article of transport while in said latched transport position being offset from said lever arm rotational axis imparts a force to maintain said latch rod in the latched transport position.

18. The carrier mounted to a vehicle of claim 17, wherein moving said article of transport carried by said receiving channel in a direction opposite to the direction of said gravitational force imparted by said offset distance allows said latch rod to move clear of said latch recess thereby permitting rotation of said lever arms into the loading/unloading position.

* * * * *